United States Patent
Durkee et al.

(10) Patent No.: US 11,408,461 B2
(45) Date of Patent: Aug. 9, 2022

(54) CAPTIVE BOLT ASSEMBLY FOR UTILITY BOXES

(71) Applicant: NewBasis West, LLC, Riverside, CA (US)

(72) Inventors: Joe Durkee, Riverside, CA (US); Chris Branson, Riverside, CA (US)

(73) Assignee: NewBasis West, LLC, Riverside, CA (US)

( * ) Notice: Subject to any disclaimer, the term of this patent is extended or adjusted under 35 U.S.C. 154(b) by 424 days.

(21) Appl. No.: 16/107,540

(22) Filed: Aug. 21, 2018

(65) Prior Publication Data
US 2019/0055980 A1 Feb. 21, 2019

Related U.S. Application Data

(60) Provisional application No. 62/548,286, filed on Aug. 21, 2017.

(51) Int. Cl.
| | |
|---|---|
| *F16B 41/00* | (2006.01) |
| *F16B 43/00* | (2006.01) |
| *F16B 35/00* | (2006.01) |
| *H02G 3/08* | (2006.01) |
| *H02G 3/14* | (2006.01) |
| *F16B 5/02* | (2006.01) |
| *F16B 33/00* | (2006.01) |

(52) U.S. Cl.
CPC .......... *F16B 41/002* (2013.01); *F16B 5/0266* (2013.01); *F16B 35/007* (2013.01); *F16B 43/001* (2013.01); *H02G 3/081* (2013.01); *H02G 3/088* (2013.01); *H02G 3/14* (2013.01); *F16B 5/0241* (2013.01); *F16B 33/008* (2013.01)

(58) Field of Classification Search
CPC ...... F16B 35/007; F16B 35/00; F16B 5/0266; F16B 5/02; H02G 3/081; H02G 3/08; H02G 3/00; H02G 3/14
See application file for complete search history.

(56) References Cited

U.S. PATENT DOCUMENTS

| | | | | |
|---|---|---|---|---|
| 2,831,520 | A * | 4/1958 | Clarke | F16B 41/002 411/349 |
| 6,786,691 | B2 * | 9/2004 | Alden, III | F16B 35/041 411/352 |
| 7,385,137 | B2 * | 6/2008 | Burke | G02B 6/4451 174/37 |
| 2012/0224935 | A1 * | 9/2012 | Chiu | F16B 5/0266 411/352 |
| 2015/0240860 | A1 * | 8/2015 | Wang | F16B 39/26 411/147 |
| 2017/0320198 | A1 * | 11/2017 | Vandenberg | B25B 21/002 |

* cited by examiner

*Primary Examiner* — Javier A Pagan
(74) *Attorney, Agent, or Firm* — Hunton Andrews Kurth LLP

(57) ABSTRACT

A durable captive bolt assembly for use with subterranean utility boxes is described. The disclosed bolt assembly includes a fastener, a conical spring, a rigid washer, a deformable washer, and a bushing. The point and threads of the fastener are designed to clear debris from an internally threaded nut and reduce or eliminate cross threading, galling, and electrolysis.

13 Claims, 6 Drawing Sheets

101

120

120

CAPTIVE BOLT ASSEMBLY FOR UTILITY BOXES

FIELD OF INVENTION

The present application is directed to a captive bolt assembly useful for utility boxes.

BACKGROUND AND SUMMARY OF THE INVENTION

Utility boxes serve to house electrical components. In some applications, utility boxes are placed below grade or under-ground. Removing the cover from subterranean utility boxes or other utility boxes which are positioned in confined spaces can be made more challenging by the limited ability to manipulate the utility box cover. Traditional fasteners can penetrate completely through the cover of a utility box, interfering with manipulation of the utility box cover even once the fastener has been unscrewed. Additionally, traditional fasteners are susceptible to cross threading, galling, and/or electrolysis. These issues can be made worse when working on utility boxes that are in a confined space and/or exposed to subterranean conditions.

There is a need for a durable fastener useful for, for example, utility boxes, junction boxes, and/or pull boxes, that avoids or reduces the likelihood of cross threading, galling, and/or electrolysis. The present invention's captive bolt assembly may accomplish all these purposes and more.

DETAILED DESCRIPTION OF THE INVENTION

Figure 1:
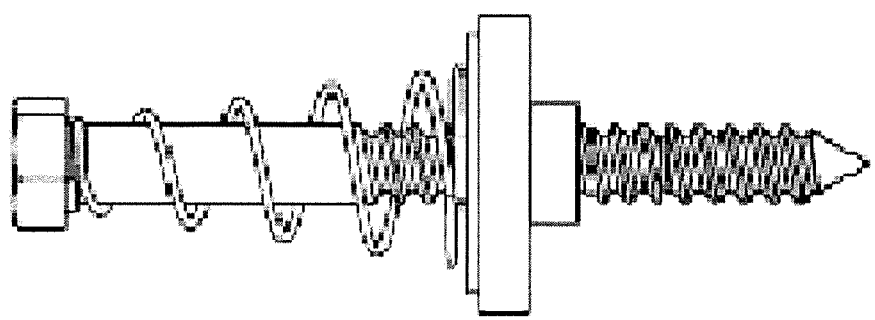
FIG. 1 depicts a an embodiment the disclosed captive bolt assembly.
Figure 2:
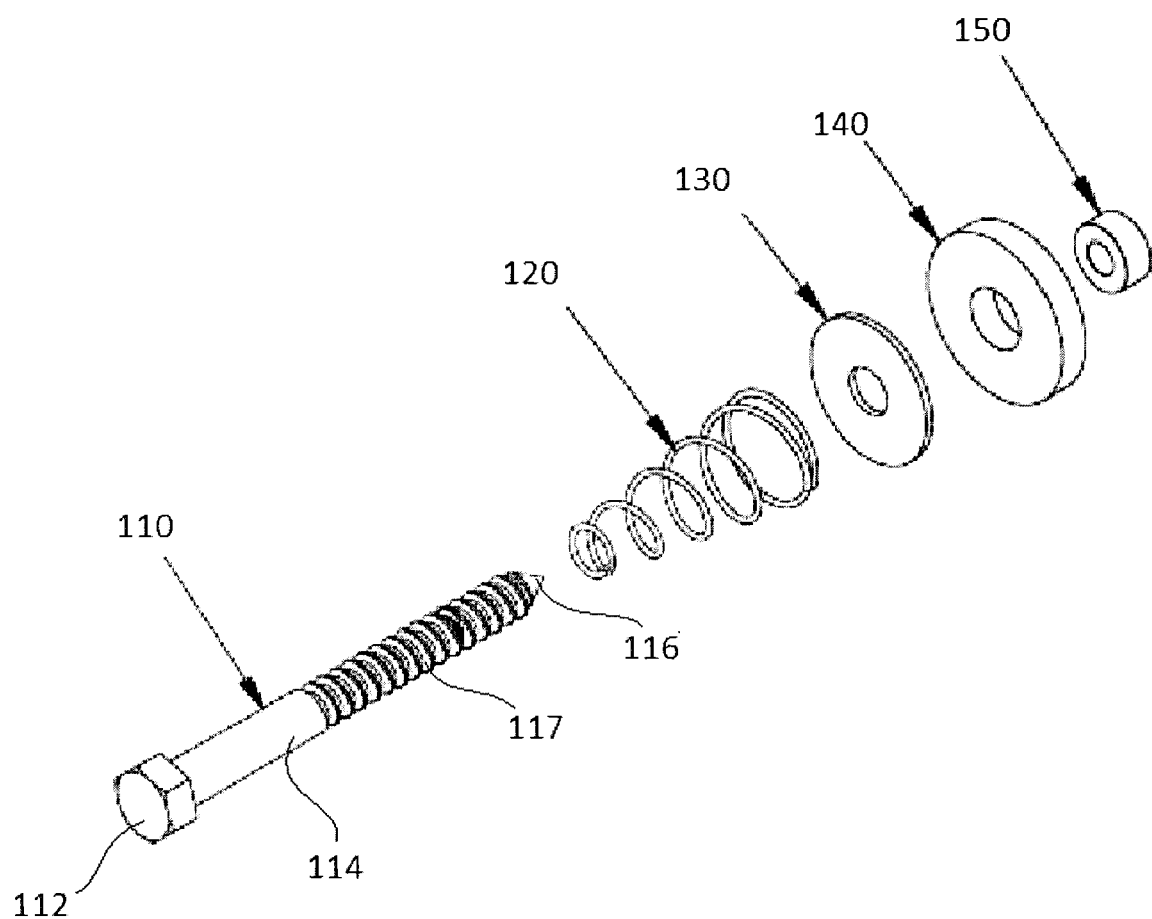
FIG. 2 depicts a disassembled schematic of an embodiment of the disclosed captive bolt assembly.
Figure 3A:
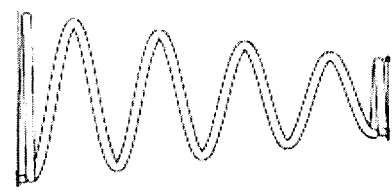
FIGS. 3A and 3B depict views of an embodiment of the disclosed conical spring.
Figure 3B:
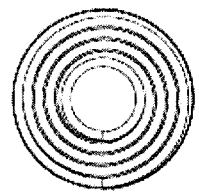
Figure 4A:
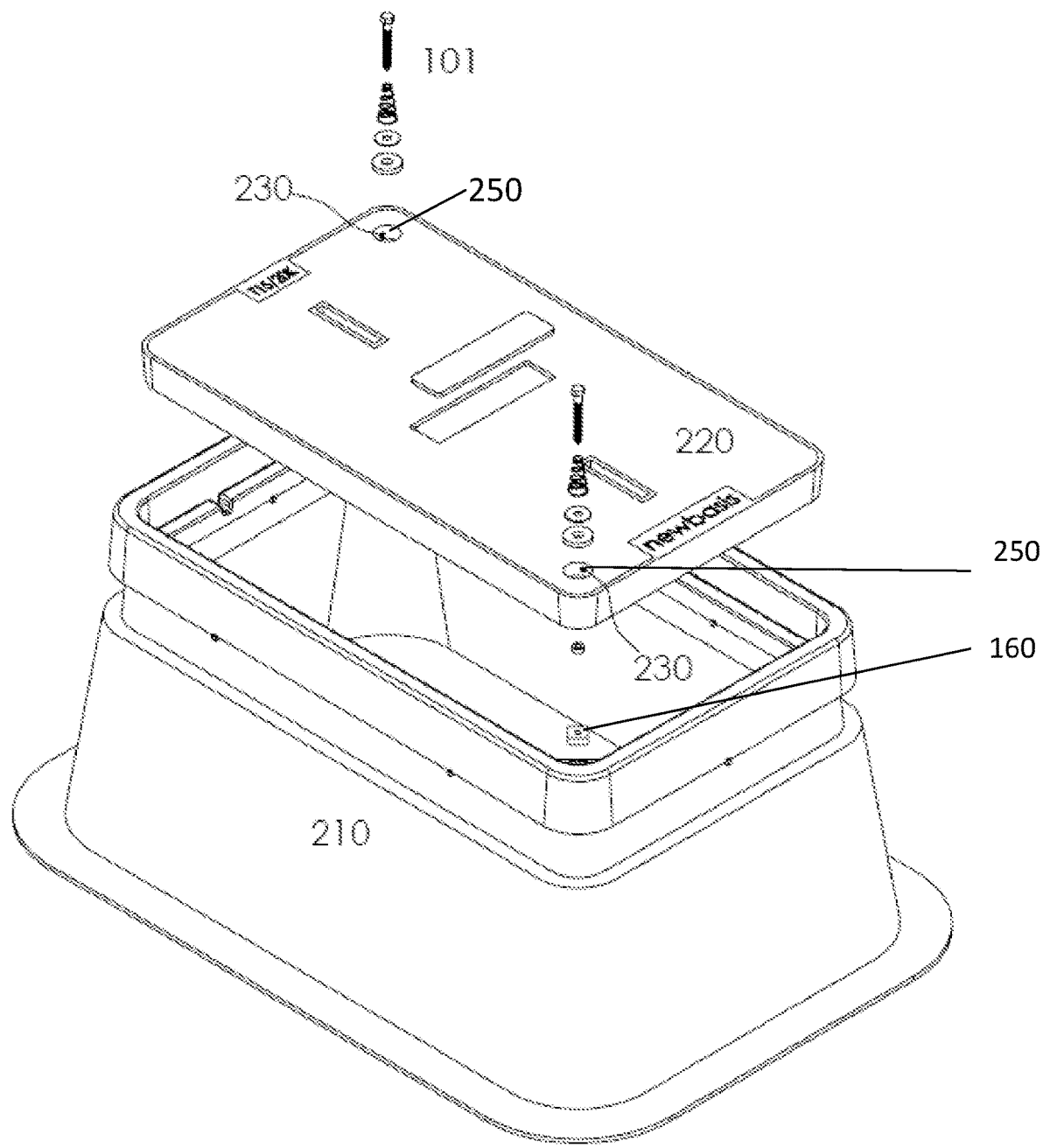
FIGS. 4A and 4B show embodiments of a utility box and utility box cover.
Figure 4B:
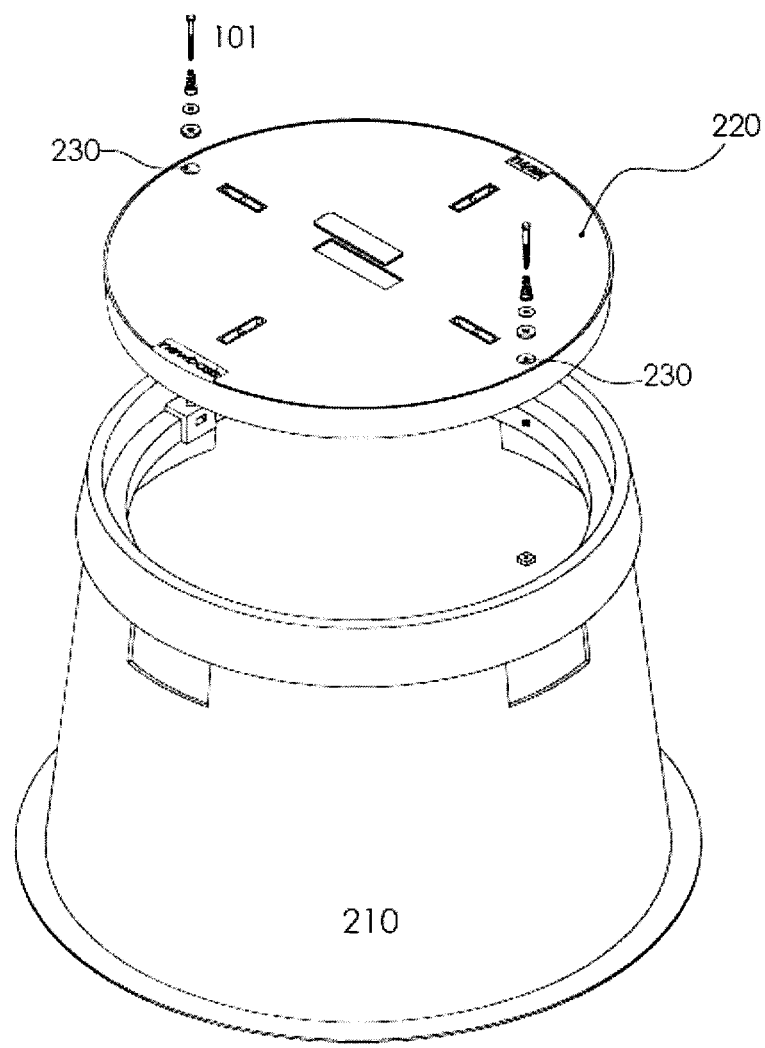
Figure 5:
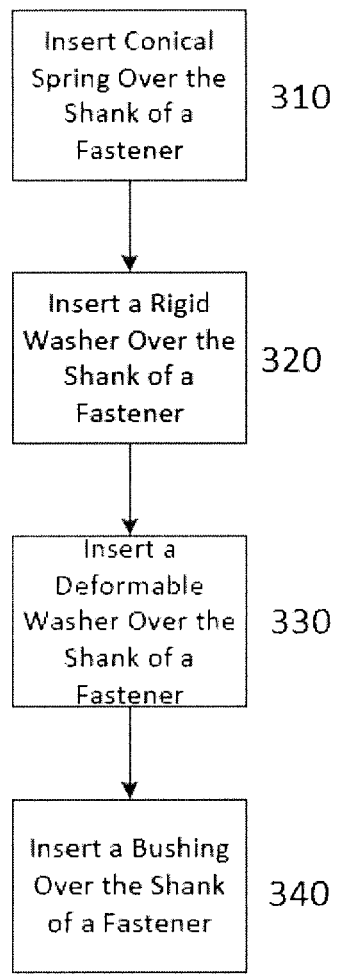
FIG. 5 depicts one method of providing a captive bolt assembly.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art. Many of the exemplary embodiments below are presented in terms of inches but it will be understood that these units may be converted to metric units and the disclosed embodiments are not limited to any particular system of units of measure.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not.

The instant invention pertains to a captive bolt assembly. Generally, the captive bolt assembly comprises one or more components such as a: fastener 110, conical spring 120, rigid washer 130, deformable washer 140, and/or bushing 150.

The disclosed captive bolt assembly 101 may be useful for applications such as securing covers 220 for utility boxes 210 such as below grade junction boxes sometimes referred to as pull boxes. In some embodiments, a utility box 210 may be made of materials including but not limited to fiberglass, concrete, polymers, metals, metal alloys, and combinations thereof. In some embodiments, the utility box cover is at least about 1.5 inches thick, or at least about 2 inches thick, or at least about 2.5 inches thick, or at least about 3 inches thick, or at least about 3.5 inches thick, or at least about 4 inches thick. In some embodiments, the utility box cover is at most about 1.5 inches thick, or at most about 2 inches thick, or at most about 2.5 inches thick, or at most about 3 inches thick, or at most about 3.5 inches thick, or at most about 4 inches thick.

The disclosed utility box 210 may be any suitable shape. It will be understood that the utility box is not limited to a cube or having a polygonal shape and may include any number of sides and/or rounded and/or angled corners. In some embodiments, the utility box cover 220 may be integral to the utility box 210. In such embodiments, the utility box cover 220 may be connected to the utility box 210 by hinges. In some embodiments, the utility box cover 220 may be completely separate from the utility box 210 and not attached other than when fastened to the utility box with a fastener.

Subterranean utility boxes 210 may be more difficult to open due to the confined nature of the space. This may prevent an operator from having the ability to position himself and/or his tools at certain angles relative to the utility box 210, utility box cover 220, and/or fastener 110 which attaches the cover 220 to the utility box 210. Working is such limited conditions may increase the likelihood of cross threading and/or galling occurring during installation of the fastener 110. Contamination associated with subterranean utility boxes 210, such as dirt, dust, organic matter, and other debris may also lead to an increase in threading and/or galling as well.

Water, humidity, and temperature fluctuations may increase the likelihood of electrolysis between a fastener 110 and any associated components. This can lead to increased corrosion and the reduced long-term performance of the fastener 110.

The disclosed bolt assembly comprises a fastener 110. In some embodiments, the fastener 110 is a lag screw. The lag screw may have any type of threads 117. In preferred embodiments the threads 117 are arranged as course auger threads in order to better penetrate into a nut 160 which may assist with clearing blockages in the nut 160 which may stop a standard bolt. The fastener 110 may include any type of point 116. In preferred embodiments, the fastener 110 includes a tapered point 116. Both a tapered point and auger threads extending substantially to the tip of the tapered point may assist with clearing debris from the interior space of a nut 160. Additionally, the tapered point 116 and auger threads 117 may reduce or prevent cross threading and/or galling.

The disclosed fastener 110 may be made of materials including, but not limited to steel, stainless steel, brass, titanium, bronze, silicone bronze, aluminum, and/or alloys thereof as well as polymers, nylon, and/or polytetrafluoroethylene.

Embodiments of the disclosed fastener 110 may have any type of point 116, including, but not limited to a chamfer cut point, radius point, cone point, dog point, drill point, type 17 point, type AB point, and or gimlet point. Preferred embodiments utilize a gimlet point in order to clear dirt and other debris from the interior of a nut 160 as the fastener 110 is being fastened to the nut 160. Certain embodiments may additionally or alternatively utilize a cutting lip for breaking up and removing dirt and debris from the screw path.

The disclosed fastener 110 is at least partially threaded and may use fine or course threads. Fastener 110 can be designed to include at least about 4 threads per inch or at least about 6 threads per inch, or at least about 8 threads per inch, or at least about 10 threads per inch or less than about 11 threads per inch, or less than about 9 threads per inch, or less than about 7 threads per inch, or less than about 5 threads per inch. The disclosed fastener 110 may use any thread-form including, but not limited to square, triangular, and/or trapezoidal. The disclosed fastener 110 may use single or double start threads. In some embodiments, double-start threads may help remove dirt and debris from the interior of a nut 160.

In some embodiments, the threads of the fastener 110 and nut 160 may be configured to allow a certain tolerance between the threads of the fastener and the nut when they are engaged. In some embodiments, the threads provide a clearance fit of classes 1A and 1B, 2A and 2B, or 3A and 3B. Embodiments with a looser thread fit between the fastener and nut may allow for reduced cross threading and/or galling caused by dirt and/or debris.

In certain embodiments, the shank 114 of the fastener 110 is at least about 2 inches long, or at least about 2.5 inches long, or at least about 3 inches long, or at least about 3.5 inches long, or at least about 4 inches long, or at least about 5 inches long, or at least about 6 inches long. In some embodiments, the shank 114 is not more than about 3 inches long, or not more than about 4 inches long, or not more than about 5 inches long, or not more than about 6 inches long.

In some embodiments the shank 114 is only partially threaded while the remaining portion, proximal to the fastener head 112 is substantially unthreaded. In some embodiments, the threaded portion is at least about 2 inches long, or at least about 2.5 inches long, or at least about 3 inches long, or at least about 3.5 inches long, or at least about 4 inches long while the remainder of the fastener is substantially unthreaded. In some embodiments, the threaded portion of the fastener is not more than about 2 inches long, or not more than about 2.5 inches long, or not more than about 3 inches long, or not more than about 3.5 inches long, or not more than about 4 inches long. In certain embodiments, the threaded portion of the fastener is between about 2.5 and 2.75 inches long.

The disclosed fastener 110 may comprise any type of head 112 including but not limited to hexagonal, slotted, washer, capped, and/or combinations thereof. Preferred embodiments comprise a hexagonal head.

In some embodiments the fastener 110 may be coated. The coating may include, but is not limited to zinc plating, hot dip galvanizing, chrome plating, polymer coating, wax coating, or any coating which reduces or eliminates corrosion and/or may influence the dielectric properties of the fastener 110.

Disclosed embodiments comprise a deformable washer 140. The deformable washer 140 may comprise materials including, but not limited to natural rubber, synthetic rubber, silicon, latex, polymer, and/or neoprene. Disclosed embodiments may further comprise a bushing 150. The bushing 150 may comprise materials including but not limited to natural rubber, synthetic rubber, silicon, latex, polymer, and/or neoprene. In some embodiments, the internal diameter of the deformable washer and/or bushing is substantially equal to the diameter of the fastener. In certain embodiments, the internal diameter of the deformable washer and/or bushing is less than the diameter of the fastener. In such embodiments, the fastener 110 may be threaded through the deformable washer and/or bushing, thereby threadedly engaging the fastener and the deformable washer and/or bushing.

The captive screw assembly 101 described may be utilized to secure a utility box cover 220 onto a utility box 210. This installation is typically performed by inserting a lag screw 110 through a pre-formed opening 230 in a utility box cover 220 and threading the lag screw 110 into an internally threaded nut 160. The lag screw 110 is rotated, thereby threadedly engaging the nut 160 until the components are joined securely. During this installation, the deformable washer 140 and/or bushing 150 may insert and/or compress into a bolt recess 250 on the utility box cover 220. The deformable washer 140 and/or bushing 150 may help prevent the lag screw 110 from loosening over time due to vibration and/or temperature fluctuation. The deformable washer 140 and/or bushing 150 may also prevent water and/or debris from entering the utility box 210 and housing in which the nut 160 is located.

Positioned between the head 112 of the fastener 110 and the deformable washer 140 is a compression spring 120. The compression spring 120 acts to remove the point 116 of the fastener 110 from the utility box 210 when the fastener 110 is not installed. This allows the utility box cover 220 to be manipulated with the fastener 110 getting caught on the body of the utility box 210. A standard utility box cover 220 does not include a handle. During installation and removal, the cover 220 is frequently moved sideways, so that an operator can grab the cover 220 in order to remove it. The compression spring 120 retracts the fastener 110 such that the utility box cover 220 may be slid without complete removal of the fastener 110 and without the fastener 110 catching on the utility box 210.

In some embodiments, the compression spring 120 may be any type of spring including, but not limited to straight, conical, hourglass, and/or barrel shaped springs. In embodiments comprising a conical spring, the spring may be designed so that each coils nest wholly, or partially into an adjacent coil. In some embodiments, the length of the fully compressed spring 120 is not more than about 5% of the length of the uncompressed spring, or not more than about 10%, or not more than about 20%, or not more than about 10%, or not more than about 30%, or not more than about 50%, or not more than about 70% of the length of the uncompressed spring. In some embodiments, the length of the fully compressed spring 120 is at least about 5% of the length of the uncompressed spring, or at least about 10%, or at least about 20%, or at least about 10%, or at least about 30%, or at least about 50%, or at least about 70% of the length of the uncompressed spring.

In certain embodiments, the length of the uncompressed spring may be substantially equivalent to the length of the threaded portion of the fastener. In some embodiments, the length of the uncompressed spring may be substantially equivalent to the total length of the fastener shank. In some embodiments, the length of the uncompressed spring may be greater than the total length of the fastener shank. In some embodiments, the length of the uncompressed spring is at least about 30% of the length of the threaded portion of the fastener, or at least about 40%, or at least about 50%, or at least about 60%, or at least about 70%, or at least about 80%, or at least about 85%, or at least about 90%, or at least about 100%, or at least about 110%, or at least about 120%, or at least about 130%, or at least about 150% the length of the threaded portion of the fastener.

In certain embodiments, the length of the uncompressed spring is at most about 30% of the length of the threaded portion of the fastener, or at most about 40%, or at most about 50%, or at most about 60%, or at most about 70%, or at most about 80%, or at most about 85%, or at most about 90%, or at most about 100%, or at most about 110%, or at most about 120%, or at most about 130%, or at most about 150% the length of the threaded portion of the fastener. In a preferred embodiment, the uncompressed spring 120 is about 75% of the length of the threaded portion of the fastener.

Some embodiments comprise a nut. The nut is typically internally threaded and configured to threadedly engage the fastener. In certain embodiments, the hole diameter of the nut may be at least about ¼ of an inch, or at least about ⅜, or at least about ½, or at least about ⅝, or at least about ¾, or at least about 1 inch. In certain embodiments, the hole diameter of the nut may be at most about ¼ of an inch, or at most about ⅜, or at most about ½, or at most about ⅝, or at most about ¾, or at most about 1 inch. In some embodiments, the height of the nut 160 may be about at least about 9/64 of an inch, or at least about 15/64, or at least about 5/16, or at least about 11/32, or at least about 29/64, or at least about 19/32, or at least about ¾, or at least about ⅞, or at least about 1 inch high. In certain embodiments, the height of the nut 160 may be about at most about 9/64 of an inch, or at most about 15/64, or at most about 5/16, or at most about 11/32, or at most about 29/64, or at most about 19/32, or at most about ¾, or at most about ⅞, or at most about 1 inch high. The threads of the nut may be course or fine. The nut may be any shape which allows the nut to be maintained in position while threadedly engaging a fastener. In a preferred embodiment, the nut is substantially square and/or configured to fit into a preformed recess within a utility box 210. The nut may be made of any suitable material, including, but not limited to steel, aluminum, brass, bronze, zinc, alloys and/or combinations thereof. In some embodiments the nut 160 may be coated. The coating may include, but is not limited to zinc plating, hot dip galvanizing, chrome plating, polymer coating, wax coating, or any coating which reduces or eliminates corrosion, electrolysis, cross-threading, and/or galling.

In certain embodiments, the fastener may comprise multiple diameters. The threaded portion of the fastener may include a major diameter or the wider diameter of the threaded portion at the peak of the threads, and a minor diameter, or the narrower diameter of the threaded portion at the valley in between threads. The fastener may also comprise a separate diameter at the unthreaded portion of the fastener. In some embodiments, the unthreaded diameter may be substantially equivalent to the minor diameter or substantially equivalent to the major diameter. In some embodiments, the unthreaded diameter may be less than the minor diameter. In certain embodiments, the unthreaded diameter may be larger than the major diameter. In some embodiments the diameter of the fastener may be between about ¼ inch and about ½ inch. In preferred embodiments the diameter of the fastener 110 is about ⅜ inch.

Some embodiments of the disclosed assembly remove dirt and/or other debris from the path of the fastener. That is, the threads of the fastener may be configured to function as an auger and may dislodge and/or break-up agglomerations of debris as the fastener rotates. The specific configuration of the auger threads may vary depending upon the application but in many cases may be helical. Various types of debris may include, but are not limited to, dirt, ice, snow, sticks, leaves, and/or other organic matter. In certain embodiments, the threads of the fastener will function as a screw conveyor to move dirt out of the opening in which the fastener is being inserted. The tip of the fastener 110 may also serve to dislodge dirt and/or debris from the interior of a nut 160 by pushing the debris through the nut and out of opposite side of the nut relative to where the fastener is being inserted. The removal of dirt and debris can help avoid cross threading and/or galling as the fastener 110 engages a nut 160. In certain embodiments, the tip of the fastener and the threads are designed to remove at least about 10% of the debris from the interior space of a nut 160, or at least about 20%, or at least about 30%, or at least about 40%, or at least about 50%, or at least about 70%, or at least about 80%, or at least about 90%, or at least about 95%, or at least about 99% of any debris from the interior space of a nut 160.

In some embodiments, the auger threads and fastener tip may be configured to extend into the interior of a nut without engaging the threads of the nut until some of the debris has been removed. The fastener tip and auger threads may be configured so that the major diameter of the fastener threads is tapered and narrow enough to avoid engagement with the threads of the nut until the tip of the fastener has been inserted into the nut at least about ⅛ of an inch into the nut, or at least about ¼ inch, or at least about ⅜, or at least about ½ inch, or at least about ⅝, or at least about ¾ of an inch into the nut.

In some embodiments, the fastener tip, auger threads of the fastener, and nut may be coordinated such that the major diameter of the fastener threads is tapered and designed to avoid engagement with the threads of the nut until the tip of the fastener has been inserted into the nut at least about 20% of the height of the nut or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150% of the height of the nut.

Disclosed embodiments relate to an assembly useful for utility boxes comprising: a lag screw comprising a point, a shank, and a head wherein the shank is at least partially threaded and wherein the shank is at least two inches long; a bushing; a deformable washer; a cone spring; and a rigid washer, wherein the lag screw point is designed to remove dirt or debris from an internally threaded nut as the nut is threadedly engaged onto the lag screw and wherein the cone spring is configured to compress as the nut is threadedly engaged onto the shank. In some embodiments, the point of the lag screw is a gimlet point and/or the head of the lag screw is substantially hexagonal. Certain embodiments further comprising auger threads.

Some embodiments relate to a utility box comprising: a utility box body designed to withstand subterranean conditions; a utility box cover comprising a plurality of openings for passing a fastener through the utility box cover and a plurality of recesses; a plurality of internally threaded nuts; and a utility box fastener assembly wherein the fastener assembly comprises a lag screw, a conical spring, a rigid washer, a deformable washer, and a bushing, and wherein the lag screw is configured to remove dirt or debris from an internally threaded nut. In some embodiments, the fastener assembly and utility box cover are configured such that the conical spring is compressed when the lag screw engages the internally threaded nut, the lag screw comprises a partially threaded shank and gimlet point; the utility box comprises fiberglass and concrete, and the utility box cover is at least about 2 inches thick and/or the cover is about 2 inches thick and the lag screw is about 3 inches thick.

Additional embodiments relate to a method of providing a captive bolt assembly comprising the steps of: inserting a conical spring over the shank of a fastener 310 wherein the conical spring has a smaller first end and a larger second end, and wherein the fastener comprises a point, shank and head, and wherein the smaller first end of the spring is proximal to the head of the fastener; inserting a rigid washer over the shank of the fastener 320, wherein the rigid washer is proximal to the larger second end of the spring; inserting a deformable washer over the shank of the fastener 330, wherein the deformable washer is adjacent to the ridged washer; and inserting a bushing over the shank of the fastener 340, wherein the bushing is adjacent to the deformable washer. In certain embodiments, the fastener is a lag screw, the lag screw has a hexagonal head and a gimlet point, and/or the deformable washer comprises neoprene and the bushing comprises neoprene.

The above description is for the purpose of teaching the person of ordinary skill in the art how to practice the present application, and it is not intended to detail all those obvious modifications and variations of it which will become apparent to the skilled worker upon reading the description. It is intended, however, that all such obvious modifications and variations be included within the scope of the present application, which is defined by the following claims. The claims are intended to cover the claimed components and steps in any sequence which is effective to meet the objectives there intended, unless the context specifically indicates the contrary.

The invention claimed is:

1. A utility box comprising:
a utility box body designed to withstand subterranean conditions;
a utility box cover comprising a plurality of openings for passing a fastener through the utility box cover and a plurality of bolt recesses;
a plurality of internally threaded nuts; and
a utility box fastener assembly wherein the fastener assembly comprises a lag screw, a conical spring, a rigid washer, a deformable washer, and a bushing, and wherein the lag screw comprises auger threads to remove dirt or debris from an internally threaded nut.

2. The utility box of claim 1, wherein the fastener assembly and utility box cover are configured such that the conical spring is compressed when the lag screw engages the internally threaded nut.

3. The utility box of claim 1, wherein the lag screw comprises an at least partially threaded shank and gimlet point.

4. The utility box of claim 1, wherein the utility box comprises fiberglass, concrete, or both and wherein the utility box cover is at least about 2 inches thick at its thickest point.

5. The utility box of claim 1, wherein the cover is between about 2 inches and about 4 inches thick at its thickest point and the lag screw is between about 3 inches and about 5 inches long.

6. The utility box of claim 1, wherein the deformable washer is configured to compress into one of the plurality of bolt recesses and comprises natural rubber, synthetic rubber, silicon, latex, polymer, or neoprene.

7. The utility box of claim 6, wherein the bushing is configured to compress into the one of the plurality of bolt recesses and comprises natural rubber, synthetic rubber, silicon, latex, polymer, or neoprene.

8. A utility box comprising:
a utility box body designed to withstand subterranean conditions;
a utility box cover comprising a plurality of openings for passing a fastener through the utility box cover and a plurality of bolt recesses;
a plurality of internally threaded nuts; and
a utility box fastener assembly comprising:
a lag screw comprising a point, a shank, and a head wherein the shank is at least partially threaded with auger threads to remove dirt or debris and wherein the threaded portion of the shank is at least two inches long;
a bushing;
a deformable washer;
a cone spring; and
a rigid washer, wherein the cone spring is configured to compress as one of the plurality of internally threaded nuts is threadedly engaged onto the shank.

9. The utility box of claim 8, wherein the lag screw comprises a gimlet point.

10. The utility box of claim 8, wherein the utility box comprises fiberglass, concrete, or both and wherein the utility box cover is at least about 2 inches thick at its thickest point.

11. The utility box of claim 8, wherein the cover is between about 2 inches and about 4 inches thick at its thickest point and the lag screw is between about 3 inches and about 5 inches long.

12. The utility box of claim 8, wherein the deformable washer is configured to compress into one of the plurality of bolt recesses and comprises natural rubber, synthetic rubber, silicon, latex, polymer, or neoprene.

13. The utility box of claim 12, wherein the bushing is configured to compress into the one of the plurality of bolt recesses and comprises natural rubber, synthetic rubber, silicon, latex, polymer, or neoprene.

* * * * *